(12) United States Patent
Flaks et al.

(10) Patent No.: US 9,232,052 B1
(45) Date of Patent: Jan. 5, 2016

(54) ANALYZING VOICE CHARACTERISTICS TO DETECT FRAUDULENT CALL ACTIVITY AND TAKE CORRECTIVE ACTION WITHOUT USING RECORDING, TRANSCRIPTION OR CALLER ID

(71) Applicant: Marchex, Inc., Seattle, WA (US)

(72) Inventors: Jason Flaks, Redmond, WA (US); Ziad Ismail, Seattle, WA (US)

(73) Assignee: Marchex, Inc., Seattle, WA (US)

( * ) Notice: Subject to any disclaimer, the term of this patent is extended or adjusted under 35 U.S.C. 154(b) by 0 days.

(21) Appl. No.: 14/550,203

(22) Filed: Nov. 21, 2014

(51) Int. Cl.
*H04M 15/00* (2006.01)
*H04M 3/38* (2006.01)

(52) U.S. Cl.
CPC ............... *H04M 3/38* (2013.01); *H04M 15/47* (2013.01)

(58) Field of Classification Search
CPC .............. H04M 2201/40; H04M 2201/41; H04M 2206/6027; H04M 3/36; H04M 3/385; H04M 3/5175; G06Q 30/02; G06Q 30/0201; G06Q 30/06; H04W 12/06; G06F 3/041; G06F 21/00; G06F 21/31; G06F 21/32; G06F 21/50; G06F 21/552; G06F 21/554
USPC ......... 379/114.04, 114.14, 32.01, 32.04, 133, 379/134, 136, 138, 143, 144.03; 704/221, 704/240, 243, 250, 273, 274
See application file for complete search history.

(56) References Cited

U.S. PATENT DOCUMENTS

| | | | | |
|---|---|---|---|---|
| 7,953,219 | B2 * | 5/2011 | Freedman et al. | 379/265.06 |
| 8,204,884 | B2 * | 6/2012 | Freedman et al. | 707/737 |
| 8,938,787 | B2 * | 1/2015 | Turgeman | 726/7 |
| 2008/0154609 | A1 * | 6/2008 | Wasserblat et al. | 704/273 |
| 2014/0096249 | A1 * | 4/2014 | Dupont et al. | 726/23 |
| 2015/0205958 | A1 * | 7/2015 | Turgeman et al. | 726/7 |

* cited by examiner

*Primary Examiner* — Binh Tieu
(74) *Attorney, Agent, or Firm* — Perkins Coie LLP (57) ABSTRACT

A system and method for monitoring telephone calls to detect fraudulent activity and take corrective action is described. The system receives a first group of telephone calls having associated voice characteristics and analyzes the first group of telephone calls to identify and store a first set of distributions of voice characteristics that are indicative of normal activity, fraudulent activity, or indeterminate activity. The system receives a second group of telephone calls to be analyzed. The system analyzes the second group of telephone calls to identify a second set of distributions of voice characteristics associated with the second group of telephone calls. The system then compares the second set of distributions of voice characteristics to the stored first set of distributions of voice characteristics to assess a probability that one or more telephone calls in the second group of telephone calls represents normal, fraudulent, or indeterminate activity. If the assessed probability of fraudulent activity exceeds a threshold, the system takes appropriate corrective action, such a flagging the fraudulent call or withholding a financial incentive associated with the fraudulent call.

38 Claims, 6 Drawing Sheets

| | Identifier | Advertiser | Distribution Channel | Voice Characteristic(s) | Time |
|---|---|---|---|---|---|
| 450 | 1 | Acme Bank | billboard_417 | vc_3 | 4/7/2012 3:15 p.m. |
| 455 | 2 | City Hospital | www2.sports555.com | vc_15 | 4/7/2012 1:45 a.m. |
| 460 | 3 | Main Street Cleaners | Freeman Times Newspaper | vc_5; vc_20 | 12/30/2010 4:40 p.m. |

| Voice Characteristics | Advertiser | Distribution Channel | Normal Activity | Fraudulent Activity | Indeterminate Activity | Time |
|---|---|---|---|---|---|---|
| vc_5; vc_9 | <any> | billboard_1 | 75% | 20% | 5% | 9/5/2014 4:17 p.m. |
| vc_9; vc_57 | Acme Bank | <any> | 15% | 50% | 35% | 9/5/2014 4:35 p.m. |
| vc_15; vc_5; vc_32 | City Hospital | web_ad_2 | 55% | 45% | 0% | 9/3/2014 6:07 p.m. |

FIG. 6

ANALYZING VOICE CHARACTERISTICS TO
DETECT FRAUDULENT CALL ACTIVITY
AND TAKE CORRECTIVE ACTION
WITHOUT USING RECORDING,
TRANSCRIPTION OR CALLER ID

BACKGROUND

Many advertisers are uncertain of the value of computer-based click advertising, but are more certain of the value of a telephone call from a prospective customer. The recognition of call value has given rise to various advertising programs that focus on delivering telephone calls to advertisers. Industry analysts have estimated that in 2013 more than $60 Billion was spent on advertising in the United States to persuade consumers to call a business. As opposed to click advertising, where the payout per click can be measured in cents or fraction of a cent, call based advertising pays orders of magnitudes more for quality calls. Unfortunately, such financial rewards have given rise to new forms of call spam and fraud.

Traditionally, spam blocking has been dependent on the people committing fraud retaining the same caller ID across multiple calls. That means that once a pattern has been identified either by a person or machine, the identified caller ID could be placed on a blacklist to prevent future calls. There are for example many sites on the Internet that list suspicious calls by caller ID. However, it has become increasingly easy for parties seeking to commit fraud to buy and use temporary phone numbers or to simply fake caller ID before making a call in order to circumvent fraud-prevention technologies based on caller ID.

There is therefore the need for a better method of spam and fraud detection that is not dependent on caller ID.

DETAILED DESCRIPTION

A system and method that monitors telephone calls to detect fraudulent activity and take corrective action is disclosed. The system analyzes a first group of telephone calls to identify distributions of voice characteristics that are indicative of one or more levels of fraud, and then applies the identified distributions of voice characteristics to subsequently received groups of telephone calls to detect fraudulent activity in the subsequently received telephone calls. Such voice characteristics exclude an analysis of the caller ID, the analysis of a transcription of a call, or the analysis of a recording of a call. When fraudulent calls are identified, the system takes corrective action with respect to the identified fraud, as described in more detail below. As used herein, the term "telephone call," "phone call," or "call" refers to any voice communication, including but not limited to any voice communication that is placed or received via a telecommunications network (e.g., Public Switched Telephone Network (PSTN), other wireline network, or wireless network) or Internet Protocol-based communication network (e.g., Voice over Internet Protocol (VoIP)). As described in more detail below, a voice characteristic may correspond to a voice pattern and may be represented by one or more metrics capable of characterizing a voice pattern, such as mel-frequency cepstrum coefficients (MFCCs).

The system analyzes a first group of telephone calls having associated voice characteristics and one or more known levels of fraudulent activity associated with the calls. The system may window calls in the first group of calls to correspond to a windowed time period (e.g., a ninety-minute time period, a twenty-four-hour time period, or a two-year time period) that is based on a system default or a user preference. The system applies one or more statistical processing techniques to the telephone calls in order to identify distributions of voice characteristics that correlate to one or more levels of likely fraud. In some embodiments, the system determines the distributions by using a probabilistic model such as a Bayesian model, hidden Markov model, or a Gaussian mixture model. In some embodiments, the system may determine the distributions using machine learning classification techniques such as logistic regression or neural networks.

In particular, the system may analyze the information in the first group of calls to identify certain distributions of voice characteristics that are indicative of normal activity (i.e., activity that is not typically indicative of fraud), to identify certain distributions of voice characteristics that are indicative of fraudulent activity (i.e., activity that is likely indicative of fraud), or and to identify certain distributions of voice characteristics that are indicative of indeterminate activity (i.e., activity that is neither indicative of normal activity or fraudulent activity). The system then stores characterizing information that enables the system to correlate future telephone calls or groups of telephone calls to one or more levels of fraudulent activity and take appropriate corrective action. The stored characterizing information includes certain voice characteristics, groups of voice characteristics, or distributions of voice characteristics that are associated with each of the identified categories.

After storing the characterizing information, the system receives one or more groups of telephone calls (i.e., a "second group" of telephone calls) to be analyzed for potential fraudulent activity. The system applies one or more statistical processing techniques to the telephone calls in order to identify distributions of voice characteristics that are present in the second group of telephone calls. The system may then window the telephone calls to consider only distributions of voice characteristics for those calls falling within a particular window that that may be based on a system default or user preference. As described in more detail below, the use of windowed time periods allows the system to detect call clustering, which occurs when an individual caller or an individual group of callers exceed a threshold number of calls within a windowed time period. After windowing, the system compares stored characterizing information derived from the first group of calls to voice characteristics associated with the received (or second) groups of telephone calls within the selected window.

By comparing distributions of voice characteristics in the second group of telephone calls to distributions of voice characteristics in the first group of telephone calls, the system may determine whether the telephone calls in the second group are indicative of normal activity, fraudulent activity, or indeterminate activity. Additionally or alternatively, the system may calculate a probability that represents the extent to which the groups of received telephone calls are indicative of fraudulent activity. For example, the system may calculate a probability in the range of 0.1 to 1.0 for groups of calls that are indicative of normal activity, with the confidence level that the groups of calls reflect normal activity increasing as the value approaches 1. Similarly, the system may calculate a probability in the range of 0.1 to 1.0 for calls that are indicative of fraudulent activity, with the confidence level that the calls reflect fraudulent activity increasing as the value approaches 1. In a similar vein, the system may calculate a probability for groups of calls that indicate neither normal activity nor fraudulent activity (i.e., indeterminate calls). In some embodiments, the system may factor in the effect of voice clustering when calculating a probability of fraudulent activity. For example, the system may analyze the distributions of voice characteristics to identify multiple telephone calls originating from the same caller or group of callers within a determined period of time. The system may determine that fraudulent activity is likely when the number of telephone calls received from a single caller or a single group of callers exceeds a threshold. Accordingly, the system may consider the degree to which the threshold is exceeded when determining a probability of fraud. For example, the determined probability of fraud may increase as the number of calls from the same individual caller or the same group of callers increases. A person of ordinary skill will appreciate that the threshold value may be set by user preference or by system default. A person of ordinary skill will further appreciate that the determined period of time may be a fixed period of time (e.g., three hours) or a windowed period of time (e.g., 1:00 p.m. to 4:00 p.m.).

When analyzing telephone calls, the system is adapted to detect voice patterns accurately even when an attempt is made to disguise a voice pattern, for example by shifting or distorting the voice by human means or machine means. In some embodiments, the system may adjust a determined probability of fraud based on whether an attempt to disguise a voice pattern is detected. For example, the system may increase a probability of fraud in response to determining that an attempt has been made to disguise a voice pattern, or the system may decrease a probability of fraud in response to determining that no attempt has been made to disguise a voice pattern.

The system may take corrective measures based on the identified level of fraud. For example, if the system identifies that received telephone calls are indicative of fraudulent activity, the system may withhold a financial incentive from the responsible entity or blacklist telephone calls from the responsible entity. Additionally or alternatively, the system may identify a distribution channel (e.g., a particular advertised telephone number) associated with the fraudulent telephone calls and take any number of actions with respect to the applicable distribution channel, including flagging the distribution channel for heightened monitoring or disabling call activity on the distribution channel. Additionally or alternatively, the system may identify a particular advertiser or a particular group of advertisers associated with the fraudulent telephone calls and take appropriate action, such as flagging calls or disabling call activity associated with the identified advertiser or group of advertisers.

Figure 1:
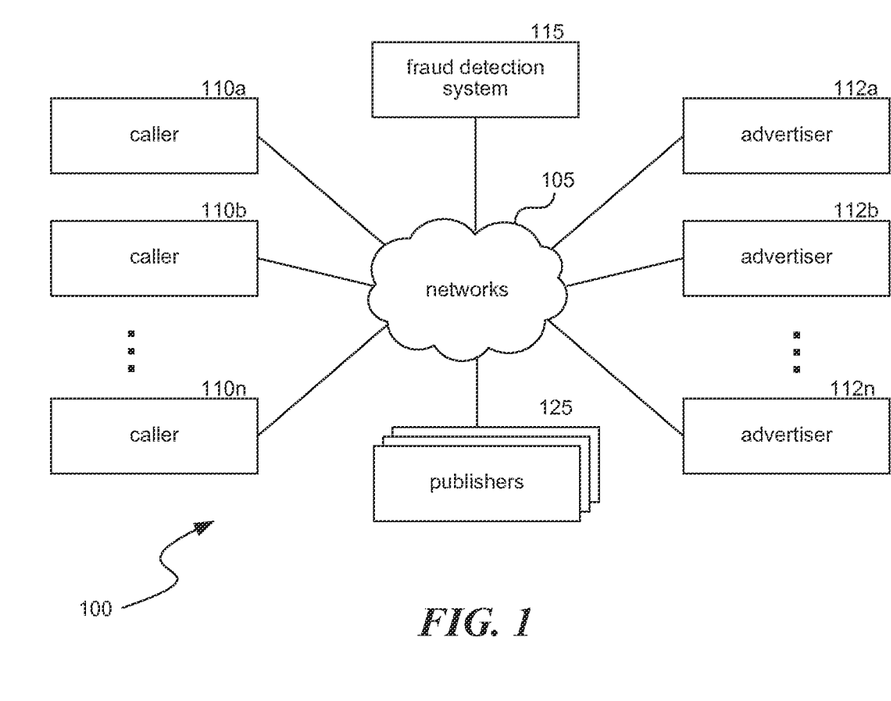
FIG. 1 is a block diagram illustrating a representative environment in which a fraud detection system may operate in accordance with embodiments disclosed herein.

FIG. 1 is a block diagram illustrating a representative environment 100 in which a fraud detection system 115 operates. Although not required, aspects and implementations of the system will be described in the general context of computer-executable instructions, such as routines executed by a general-purpose computer, a personal computer, a server, or other computing system. The system can also be embodied in a special purpose computer or data processor that is specifically programmed, configured, or constructed to perform one or more of the computer-executable instructions explained in detail herein. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programmable logic devices (PLDs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

The system and method can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Aspects of the system described herein may be stored or distributed on tangible, non-transitory computer-readable media, including magnetic and optically readable and removable computer discs, stored in firmware in chips (e.g., EEPROM chips). Alternatively, aspects of the system may be distributed electronically over the Internet or over other networks (including wireless networks). Those skilled in the relevant art will recognize that portions of the system may reside on a server computer, while corresponding portions reside on a client computer.

Referring to the example of FIG. 1, the fraud detection system 115 is communicably coupled to one or more callers 110 (shown individually as callers 110a-110n) via one or more networks 105. The fraud detection system 115 is also communicably coupled to one or more advertisers 112 (shown individually as advertisers 112a-112n) via the networks 105. A caller 110 may be an individual person, a business, a governmental agency, or any other entity capable of initiating telephone calls for any reason, including calls initiated in response to advertisements for products or services. An advertiser 112 similarly may be an individual person, a business, a governmental agency, or any other entity capable of receiving telephone calls in response to advertisements that are placed by the advertiser. The fraud detection system 115 is capable of monitoring when telephone calls are made from the callers 110 to the advertisers 112, and may process such calls (i.e., "received calls" or "second group of calls") to determine an associated level of fraudulent activity and take corrective action if necessary. Networks 105 are any network suitable for communicably coupling the callers 110, the advertisers 112 and the fraud detection system 115, such as a Voice over Internet Protocol (VoIP) network, a cellular telecommunications network, a public-switched telephone network (PSTN), any combination of these networks, or any other suitable network that can carry data and/or voice telecommunications.

The callers 110, advertisers 112 and fraud detection system 115 may also communicate with each other and with publishers 125 via public or private networks 105, including for example, the Internet. The fraud detection system 115 may provide an interface such as a website that allows system users to access the fraud detection system 115, and which provides data regarding the fraud detection services and functions. The publishers 125 provide content which displays or uses call tracking phone numbers provided from a call tracking system (not shown) to enable callers to call advertisers. More information regarding call tracking systems may be found in U.S. patent application Ser. No. 12/829,375, entitled "SYSTEM AND METHOD TO ANALYZE CALLS TO ADVERTISED TELEPHONE NUMBERS," filed on Jul. 1, 2010, which is incorporated herein by reference in its entirety.

The callers 110 and advertisers 112 may have mobile devices and computers that are utilized for communicating with each other and with the publishers 125 through the network 105. Any mobile devices may communicate wirelessly with a base station or access point using a wireless mobile telephone standard, such as the Global System for Mobile Communications (GSM), Long Term Evolution (LTE), or another wireless standard, such as IEEE 802.11, and the base station or access point may communicate with the fraud detection system 115 and publishers 125 via the network 105. Computers may communicate through the network 105 using, for example, TCP/IP protocols.

Figure 2:
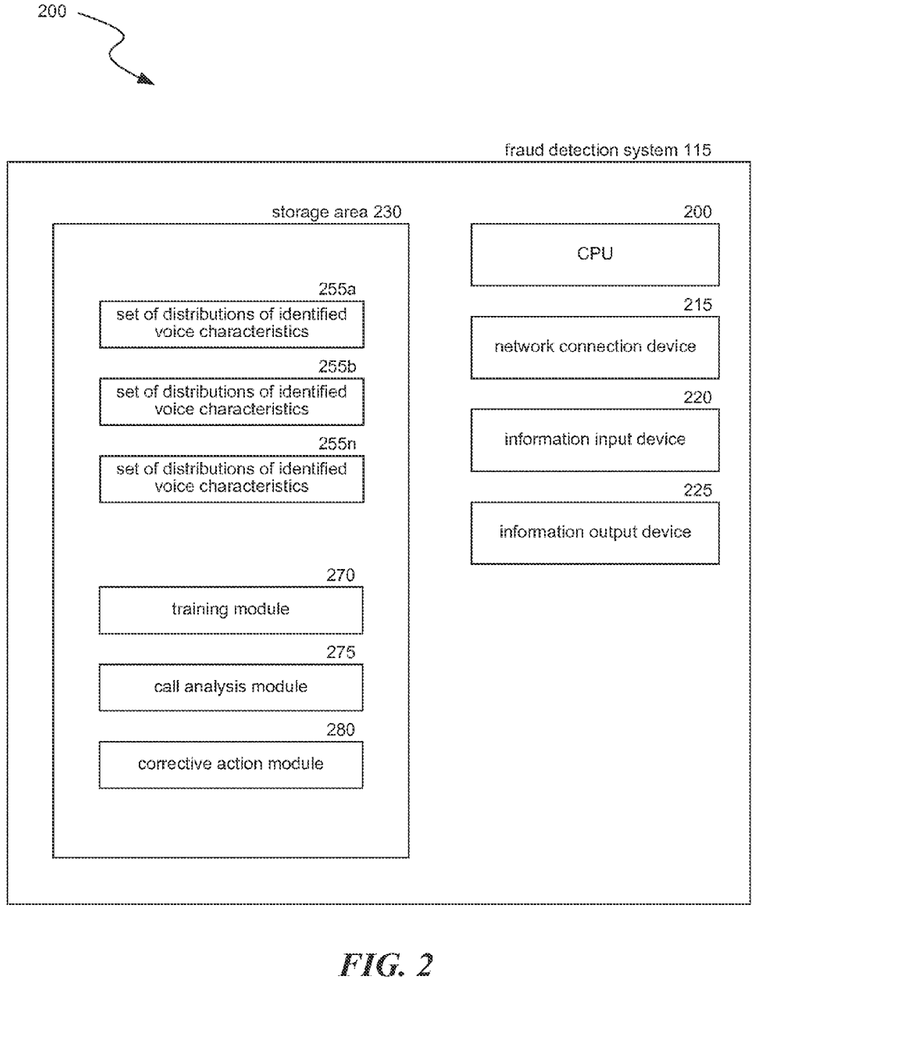
FIG. 2 is a block diagram providing a detailed illustration of a fraud detection system in accordance with embodiments disclosed herein.

FIG. 2 is a block diagram illustrating the fraud detection system 115 in more detail. The fraud detection system 115 includes a storage area 230. The storage area 230 includes software modules and data that, when executed or operated on by a processor, perform certain of the methods or functions described herein. The storage area may include components, subcomponents, or other logical entities that assist with or enable the performance of some or all of these methods or functions. For example, the modules may in some embodiments be utilized to implement a training module 270 to window a given group of known telephone calls, and identify sets of distributions of voice characteristics for a given group of known telephone calls; a call analysis module 275 to analyze a received call or group of calls to identify sets of distributions of voice characteristics that are associated with the received call or group of calls, window the received call or group of calls, and determine a probability of whether the received call or group of calls correspond to normal, fraudulent, or indeterminate activity; and a corrective action module 280 to determine whether a determined probability of fraud exceeds a threshold, and if so, to take appropriate corrective action. Training module 270, call analysis module 275, and corrective action module 280 will each be described in more detail with respect to FIGS. 3-6.

The stored data include one or more sets of distributions of voice characteristics 255a-255n that correspond to groups of telephone calls having known levels of fraudulent activity, as well as to one or more received telephone calls that are to be analyzed for fraudulent call activity. Additional information regarding the one or more sets of stored distributions of voice characteristics 255a-255n is described in more detail with respect to FIGS. 3-6. A person of ordinary skill will appreciate that storage area 230 may be volatile memory, non-volatile memory, a persistent storage device (for example, an optical drive, a magnetic hard drive, a tape of a tape library, etc.), or any combination thereof.

The fraud detection system 115 further includes one or more central processing units (CPU) 200 for executing software stored in the storage area 230, and a computer-readable media drive for reading information or installing software from tangible computer-readable storage media, such as a floppy disk, a CD-ROM, a DVD, a USB flash drive, and/or other tangible computer-readable storage media. The fraud detection system 115 also includes one or more of the following: a network connection device 215 for connecting to a network, an information input device 220 (for example, a mouse, a keyboard, etc.), and an information output device 225 (for example, a display).

Figure 3:
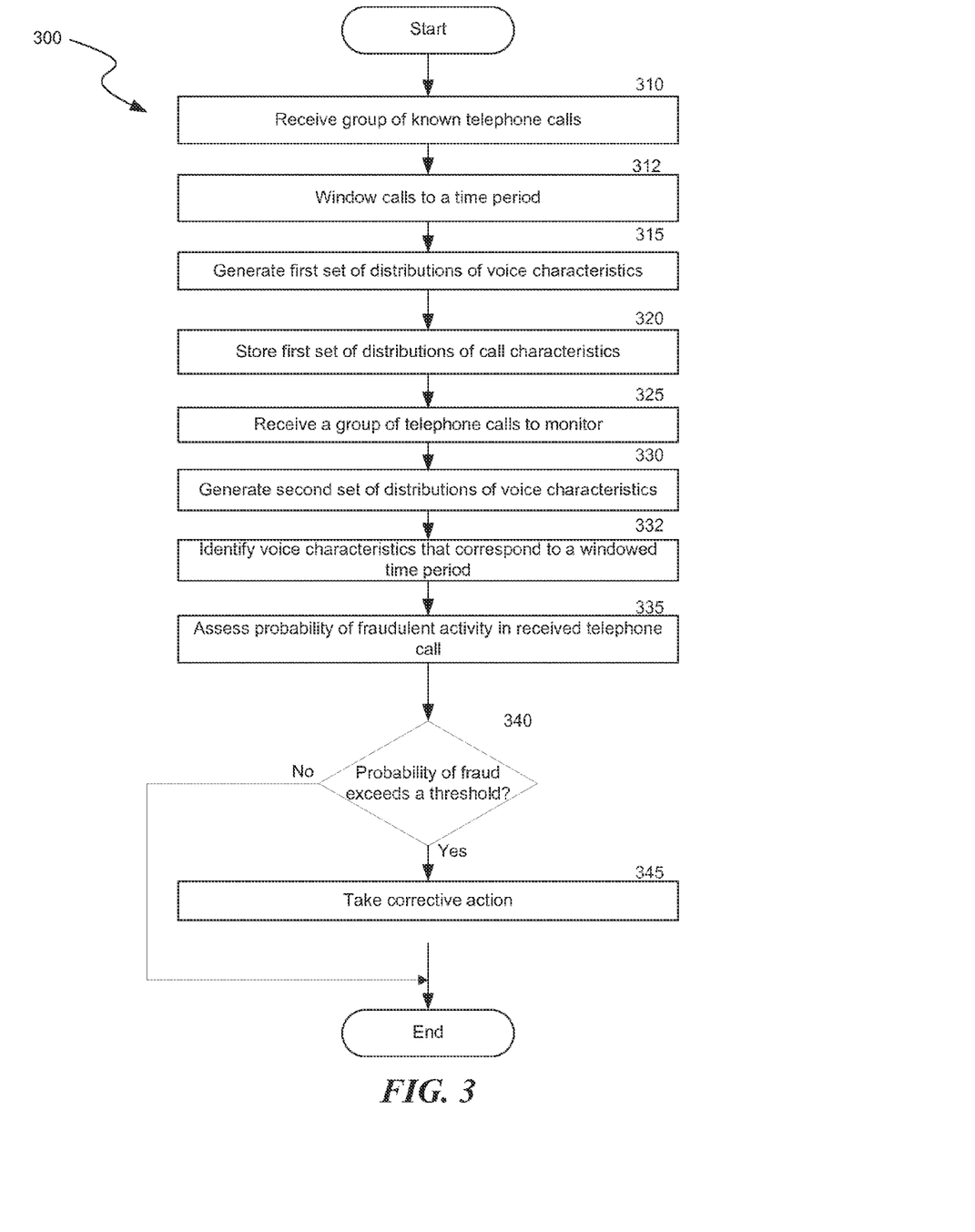
FIG. 3 is a flowchart that illustrates detecting fraudulent call activity and taking corrective action in accordance with embodiments disclosed herein.

FIG. 3 is a flowchart showing a method implemented by fraud detection system 115 to detect fraudulent call activity and take corrective action without recording, transcription or caller ID. In steps 310-320, the system executes a training function to generate a first set of distributions of voice characteristics that are indicative of one or more levels of fraud activity—such as normal activity, fraudulent activity, or indeterminate activity—that is associated with a group of known telephone calls. At step 310, the system receives a group of telephone calls that correspond to a known level of fraudulent activity (i.e., "known telephone calls"). In addition, the system receives corresponding information for individual telephone calls within the known group of telephone calls, for example including an identification of an associated advertiser (i.e., an advertiser who placed or received the telephone call), an identification of an associated distribution channel (e.g., a website, online advertisement, search engine result, billboard advertisement, print advertisement, radio or television advertisement, etc.), an identification of an associated time (e.g., the time the call was initiated; the time the call was concluded; or the duration of the call), or an identification of one or more associated voice characteristics. Voice characteristics include information that enables the system to distinguish among individual callers or groups of callers. For example, the system may represent voices present in a telephone call by a mel-frequency cepstrum (MFC), with individual voice characteristics corresponding to mel-frequency cepstrum coefficients (MFCCs). A person of ordinary skill will appreciate that the system may employ voice characteristics that correspond to any number of different speech processing methodologies and is therefore not limited to MFC.

At step 312 the system windows the known telephone calls to a period of time by selecting a subset of the known telephone calls that correspond to a particular windowed time period. A windowed time period may be any date range, time range, or specified duration of time. For example, the windowed time period may be a date range such as December 2 through December 12, or the year 2012 through the year 2014. As another example, the windowed period of time may be a time range such as 11:00 a.m. through 3:30 p.m., or Mar. 15, 2011, at 5:00 p.m. through Jun. 19, 2013, at 2:37 p.m. As yet another example, the windowed time period may be a specified duration of time such as 90 minutes, 247 seconds, or 15 days. The system may select a particular windowed time period based on operator or user input, or may select the windowed time period from one or more predetermined or configurable system default values. In the case of system default values, the system may select a default value for the windowed time period according to multiple criteria, including for example an advertiser or distribution channel that is associated with one or more of the known calls. In some embodiments, the system may select multiple windowed time periods to be analyzed concurrently or sequentially by the system.

Figure 5A:
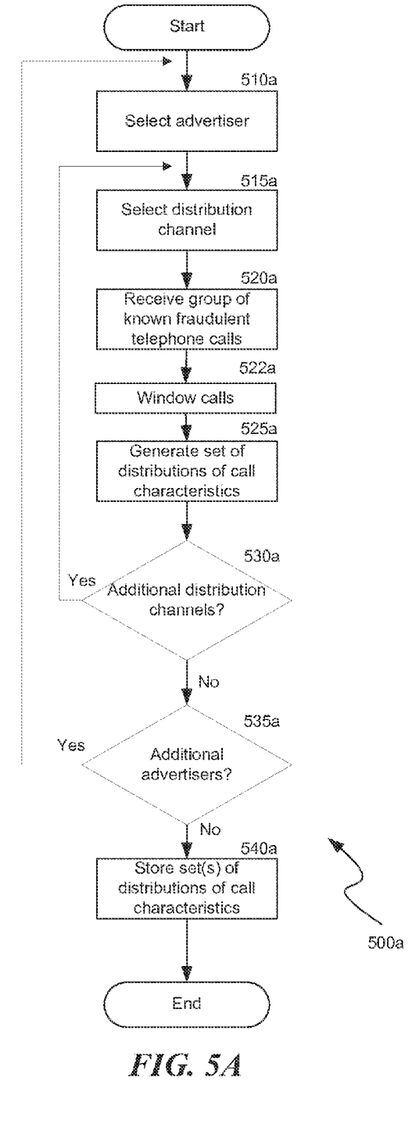
FIG. 5A is a flowchart showing the analysis of a group of known telephone calls in accordance with embodiments disclosed herein.
Figure 5B:
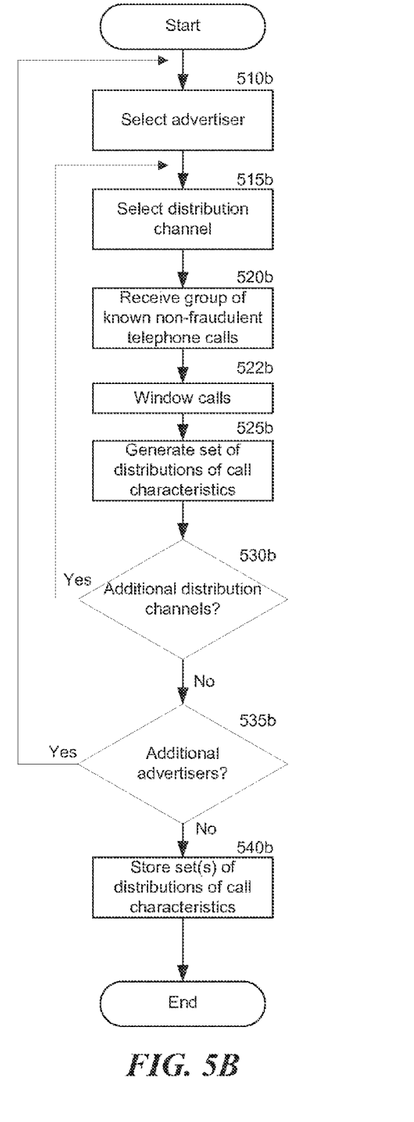
FIG. 5B is a flowchart showing the analysis of a group of known telephone calls in accordance with embodiments disclosed herein.

At step 315 the system analyzes the group of known telephone calls to generate a first set of distributions of voice characteristics that is indicative of one or more levels of fraud activity, such as normal activity, fraudulent activity, or indeterminate activity. Calls in the group of known telephone calls may have multiple audio channels, for example an audio channel associated with a caller and an audio channel associated a call recipient. The group of known telephone calls may correspond to a single advertiser or may correspond to multiple advertisers. Likewise, the group of known telephone calls may correspond to a single distribution channel or to multiple distribution channels. Additional details regarding the generation of the first set of distributions of voice characteristics is described below with respect to FIG. 5.

At step 320, the fraud detection system stores the generated first set of distributions of voice characteristics for subsequent use in analyzing a received telephone call. Additional details regarding the first set of distributions of voice characteristics is described with respect to FIG. 6. At step 325, the system receives a telephone call or a group of telephone calls to be analyzed for fraudulent activity. The received telephone call or group of telephone calls may have multiple audio channels, for example an audio channel associated with a caller and an audio channel associated with a call recipient. Telephone calls in the received group of telephone calls are typically initiated in response to viewing or hearing an associated telephone number in an advertisement via a distribution channel. The telephone calls are typically received by a business (e.g., by a person who works for the business or by an Interactive Voice Response (IVR) system of the business) that is responsible for the advertisement. At step 330, the system analyzes the received telephone call or the group of received telephone calls to identify a second set of distributions of voice characteristics associated with the received telephone call or group of telephone calls. At step 332, the system selects voice characteristics that correspond to a subset of the known telephone calls that fall within a particular windowed time period. As discussed above with respect to step 312, the windowed time period may be any date range, time range, or specified duration of time. The system may select a particular windowed time period based on operator or user input, or may select the windowed time period by one or more predetermined or configurable system defaults, as explained above. At step 335, the system assesses a probability that the one or more received calls in the windowed time period are associated with fraudulent activity. As explained in more detail with respect to FIG. 6, the fraud detection system compares the second set of distributions of voice characteristics (associated with the received call) to the first set of distributions of voice characteristics (associated with the known group of calls) to identify the probability of fraudulent, normal, or indeterminate activity associated with the received call. The comparison may be performed on a per-advertiser basis or a per-distribution channel basis, thereby allowing for greater flexibility in tailoring the fraud detection to suit the specific needs of one or more advertisers.

At step 340, the fraud detection system determines whether the determined probability of fraud exceeds a threshold. The threshold may be set by a user or a system operator and may be used as a trigger to cause the system to take corrective action to remedy any detected fraud. For example, if the system detects that a telephone call has a probability of fraudulent activity that meets or exceeds the threshold, the system may proceed to step 345 to take corrective action by flagging the distribution channel associated with the call for heightened monitoring or disabling call activity on the distribution channel. As another example, the fraud detection system may withhold a financial incentive from a party associated with the telephone call, withhold a financial incentive from a party associated with generating telephone calls via an associated distribution channel, blacklist a caller who initiated the telephone call (i.e., prevent future calls from the caller from being routed to the advertiser), log the occurrence of the call (including one or more of the calculated threshold, associated voice characteristics, associated advertiser, associated distribution channel, time of call, duration of call, or other associated information) to non-volatile memory, or provide a notice to a system operator. In the case of providing a notice to the system operator, the notice may include the determined probability of fraud. As yet another example, the fraud detection system may take corrective action by not charging the advertiser for activity associated with the fraudulent call in the event that the probability of fraud exceeds a threshold. If the fraud detection system detects that the probability of fraud does not exceed a specified threshold at step 345, the system may decline to take corrective action.

Figure 4:
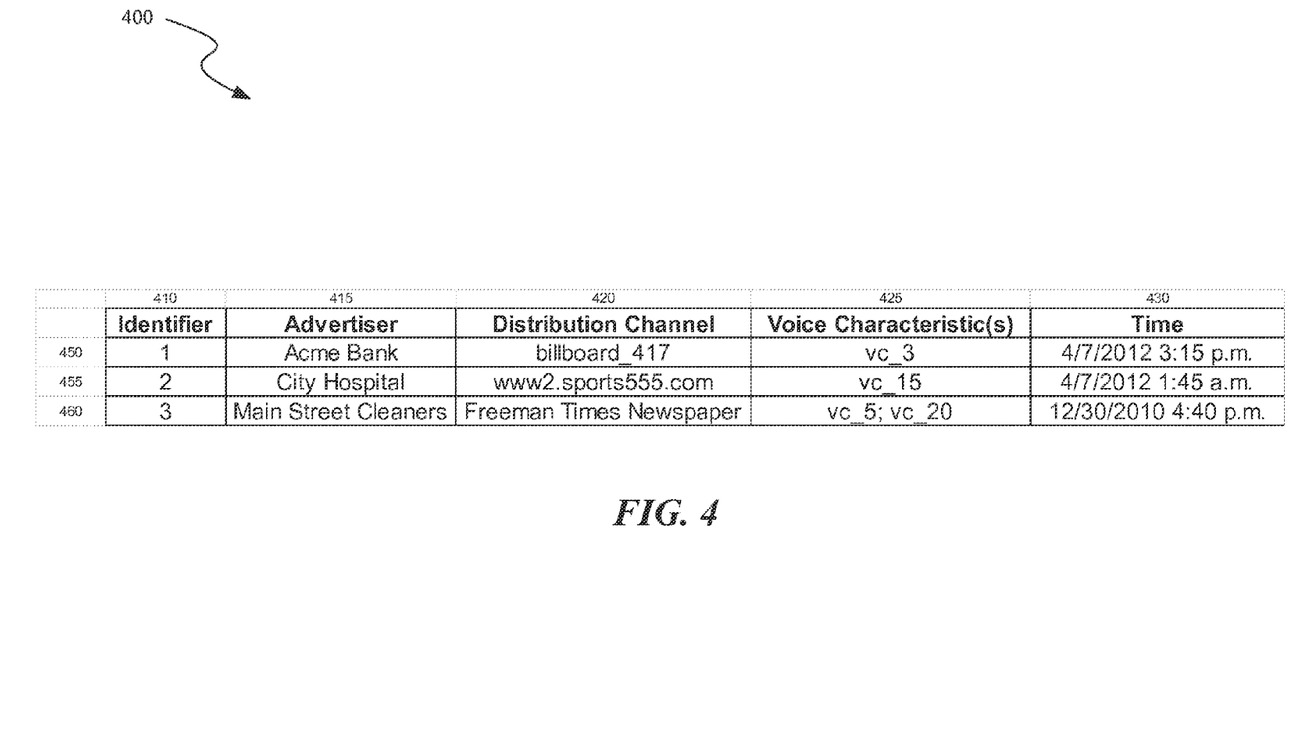
FIG. 4 is a table illustrating an example group of known telephone calls that is received by the fraud detection system.

FIG. 4 is a table illustrating a group of known telephone calls that is received by the fraud detection system for use in generating a first set of distributions of voice characteristics that are indicative of normal activity, fraudulent activity, or indeterminate activity. Table 400 contains five columns corresponding to various information that may be received for each telephone call in the known group of telephone calls: column 410, labeled "Identifier," which assigns a unique number or code to each telephone call within the known group of telephone calls; column 415, labeled "Advertiser," which identifies the advertiser that placed or received each telephone call; column 420, labeled "Distribution Channel," which identifies the distribution channel associated with each telephone call; column 425, labeled "Voice Characteristic (s)," which identifies one or more voice characteristics that are associated with each telephone call; and column 430, labeled "Time," which identifies a time associated with each phone call, such as a start time or end time of the telephone call. Using the information in column 430, the system is able to process telephone calls corresponding to a particular windowed time period.

Table 400 illustrates a group of telephone calls containing three telephone calls. Row 450 corresponds to a telephone call that was received at 3:15 p.m. on Apr. 7, 2012, by Acme Bank in response to a telephone number that was advertised on a billboard (identified by "billboard_417"), and that contained voice characteristic "vc_3." Row 455 corresponds to an IP-based telephone call that was received at 1:45 a.m. on Apr. 7, 2012, by City Hospital after being initiated by a caller who clicked an advertisement on the www2.sports555.com website, and contained voice characteristic "vc_15." Row 460 corresponds to a telephone call that was received at 4:40 p.m. on Dec. 30, 2010, by Main Street Cleaners in response to a print advertisement that appeared in the Freeman Times newspaper, the call containing voice characteristics "vc_5" and "vc_20." Although Table 400 depicts five columns of information, a person of ordinary skill in the art will appreciate that Table 400 may contain columns of information in addition to those shown (including, for example, the telephone number that was dialed, the context in which the telephone number was dialed, the duration of the telephone call, etc.). A person of ordinary skill further will appreciate that Table 400 may omit certain information for a particular telephone call while including other information for the call (e.g., Table 400 may include advertiser information but omit distribution information for a first telephone call, or may include distribution information but omit advertiser information for a second telephone call). Although Table 400 depicts a single entry (i.e., row) for a telephone call having multiple voice characteristics, a person of ordinary skill will appreciate that such a telephone call having multiple voice characteristics may be represented by multiple entries in Table 400 (i.e., one entry for each associated call characteristic). In addition, although Table 400 contains telephone calls corresponding to multiple advertisers and multiple distribution channels, a person of ordinary skill will appreciate that separate tables may be compiled on a per-advertiser or per-distribution channel basis.

FIG. 5A is a flowchart showing a method implemented by the fraud detection system for analyzing a group of known telephone calls to generate a first set of distributions of voice characteristics that are indicative of normal activity, fraudulent activity, or indeterminate activity. At step 510*a*, the system selects an advertiser that is associated with a group of telephone calls that is to be analyzed. An advertiser may correspond to an individual company or entity, such as a corporation, bank, hospital, school, coffee shop, or a particular department or subgroup thereof (e.g., a selected advertiser may be a credit department or an investment services department within the same bank). At step 515*a*, the system selects a distribution channel that is associated with the group of telephone calls that is to be analyzed. A distribution channel may correspond to any physical or electronic medium through which a given telephone number is advertised. For example, a distribution channel may correspond to a banner advertisement that displays a telephone number on a website, a radio or television advertisement that displays or announces a telephone number, or a physical billboard advertisement that displays the telephone number.

At step 520*a*, the fraud detection system receives a group of telephone calls to be analyzed. In the embodiment of FIG. 5A, the system receives a group of telephone calls that is known to be associated with fraudulent activity. At step 522*a*, the system selects a subset of the known fraudulent telephone calls that corresponds to a particular windowed time period. The windowed time period may correspond to any date range, time range, or specified duration of time, as discussed above. At step 525*a*, the system applies statistical processing (e.g., scoring functions, machine learning algorithms including, but not limited to, logistic regression, support vector machines, or neural networks) to the group of telephone calls in the selected windowed time period in order to generate a set of distributions of voice characteristics that are indicative of fraudulent activity. Additional information regarding the distributions of voice characteristics is further described with respect to FIG. 6.

At step 530*a*, the system determines whether the analysis should be repeated to create additional sets of distributions of voice characteristics with respect to one or more additional distribution channels. If an analysis is desired for one or more additional distribution channels, the system returns to step 515*a* to repeat the analysis. If no additional distribution channels remain to be analyzed, the system proceeds to step 535*a* to determine whether an analysis is desired to create additional sets of distributions of voice characteristics for one or more additional advertisers. If an analysis is desired for one or more additional advertisers, the system returns to step 510*a* to repeat the analysis. If no additional advertisers remain to be analyzed, the system proceeds to step 540*a* to store the sets of distributions of voice characteristics that have been generated for subsequent use in analyzing a received telephone call or a group of received telephone calls. Although the steps of FIG. 5A are shown in a particular order, a person of ordinary skill will appreciate that certain steps of FIG. 5A may be performed in a different order than shown. For example, the fraud detection system may select a distribution channel before selecting an advertiser. The fraud detection system may store each respective set of distributions of voice characteristics as each is generated (rather than waiting until multiple sets of distributions of voice characteristics are generated for different advertisers or distribution channels). A person of ordinary skill also will appreciate that, in some embodiments, the fraud detection system may generate sets of distributions of voice characteristics without respect to a particular distribution channel or advertiser.

FIG. 5B is substantially similar to FIG. 5A, the primary difference being that at step 520*b*, the fraud detection system receives a group of telephone calls for analysis that are known to be associated with non-fraudulent activity. At step 522*b*, the system selects a subset of the known non-fraudulent telephone calls that correspond to a particular windowed time period. At step 525*b*, the system applies statistical processing (e.g., scoring functions, machine learning algorithms including, but not limited to, logistic regression, support vector machines, or neural networks) to the group of telephone calls in order to generate a set of distributions of voice characteristics that are indicative of non-fraudulent activity. At step 535*b*, the system stores the generated set(s) of distribution of voice characteristics for non-fraudulent call activity for subsequent use in analyzing a received telephone call or a group of received telephone calls.

A person of ordinary skill will appreciate that the system may perform the analysis described in FIGS. 5A and 5B with respect to additional types of known groups of telephone calls, including groups of telephone calls that are known to be neither fraudulent nor non-fraudulent (i.e., indeterminate calls). Although FIGS. 5A and 5B and their corresponding descriptions depict a separate analysis of fraudulent calls, non-fraudulent calls, and indeterminate calls, a person of ordinary skill will appreciate that in some embodiments the fraud detection system may derive sets of distributions of voice characteristics for indeterminate calls by identifying sets of distributions of voice characteristics that are not present for either fraudulent calls (e.g., FIG. 5A) or normal calls (e.g., FIG. 5B). A person of ordinary skill will also appreciate that the system may generate multiple windowed time periods at steps 522*a* and 522*b*. In such cases, the system may generate respective sets of voice characteristics at step 525*a* and 525*b* that correspond to a particular windowed time period or that contain information allowing the system to separate the generated distributions of voice characteristics on a per-windowed time period basis.

Figure 6:
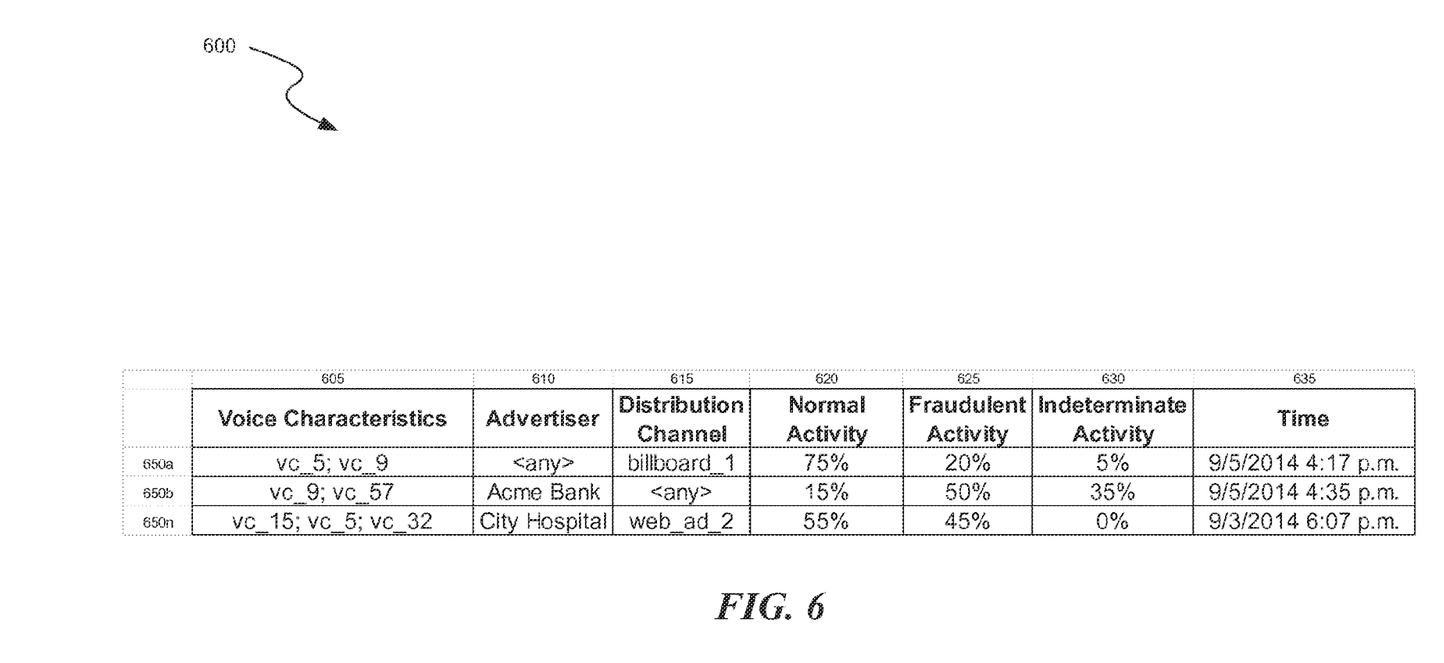
FIG. 6 is a table illustrating an example generated set of voice characteristics that are indicative of a given level of fraudulent activity.

FIG. 6 is a table illustrating a generated set of voice characteristics that are indicative of a given level of fraudulent activity. Table 600 includes rows 650*a*-650*n*, where each row represents a particular distribution of voice characteristics for which a corresponding probability of fraudulent, normal, or indeterminate call activity is likely. Table 600 contains columns corresponding to an associated time (635), for example a start time or end time; a particular distribution of voice characteristics (605); an associated advertiser (610); an associated distribution channel (615); and an associated probability of normal activity (620), fraudulent activity (625), and indeterminate activity (630) for the given distribution of voice characteristics. For example, entry 650*a* indicates that a call on Sep. 5, 2014, at 4:17 p.m. having a distribution of voice characteristics corresponding to "vc_5" and "vc_9," for any advertiser, on distribution channel "billboard_1" has a 75% probability of being a normal (i.e., non-fraudulent) call, a 20% probability of being a fraudulent call, and a 5% chance of being an indeterminate call. Entry 650*b* indicates that a call on Sep. 5, 2014, at 4:35 p.m. having a distribution of voice characteristics corresponding to "vc_9" and "vc_57," for Acme Bank, on any distribution channel has a 15% probability of being a normal call, a 50% probability of being a fraudulent call, and a 35% chance of being an indeterminate call. Entry 650*n* indicates that a call on Sep. 3, 2014, at 6:07 p.m. having a distribution of voice characteristics corresponding to "vc_15," "vc_5," and "vc_32," for City Hospital, on distribution channel "web_ad_2" has a 55% probability of being a normal call, a 45% probability of being a fraudulent call, and a zero percent probability of being an indeterminate call.

A person of ordinary skill in the art will appreciate that, for any given entry, column 605 may contain a distribution that may contain any number of voice characteristics. Likewise, a person of ordinary skill will appreciate that Table 600 may contain any number of entries corresponding to different distributions of voice characteristics. In addition, a person of ordinary skill will appreciate that the probabilities of normal, fraudulent, and indeterminate activity may be represented on any numeric scale, including, for example, numerical percentages, or positive numbers to indicate a likely probability for a particular level of fraud and negative numbers to indicate an unlikely probability for a particular level of fraud.

The fraud detection system may use information stored in Table 600 to determine whether a received call is likely normal, fraudulent, or indeterminate, and take any necessary corrective action. By matching information associated with the received call to information stored in conjunction with one or more sets of distributions of voice characteristics, the fraud detection system is able to identify the probability of fraudulent, normal, or indeterminate activity associated with the received call. For example, the fraud detection system may receive a phone call that was placed to Acme Bank after the telephone number was broadcast via distribution channel "radio_ad_17." After analyzing the call, the system may determine that the received phone call contains voice characteristics corresponding to "sale" and "non product or service." The fraud detection system then searches the stored sets of distributions of voice characteristics in Table 600. Because entry 650*b* corresponds to advertiser "Acme Bank" and the voice characteristics correspond to "sale" and "non-product or service," the fraud detection system identifies entry 650*b* as a match for the received call. Note that, in the current example, entry 650*b* corresponds to any advertiser, and therefore the system matches the received call to entry 650*b* regardless of the actual advertiser that is associated with the received call. Because the received call matches 650*b*, the system identifies the corresponding probabilities: 15% probability of normal activity; 50% probability of fraudulent activity; and 35% probability of indeterminate activity.

In some embodiments, the system may increase the determined probability of fraudulent activity in response to detecting that multiple telephone calls from an individual caller, or multiple telephone calls from a particular group of callers, were received within a determined period of time. The system may detect such call clustering based on a default parameter or a user-specified parameter that corresponds to a fixed period of time or a windowed period of time, as well as a user-specified or system default threshold number of telephone calls received during the windowed period of time. For example, the system may default to a parameter that detects call clustering when ten or more calls are received from an individual caller or group of callers between the hours of 8:00 a.m. to 5:00 p.m. on a given day. As another example, the system may use a user-specified parameter for detecting call clustering when two or more calls are received from an individual caller or group of callers within a fifteen-minute time period. A person of ordinary skill in the art will appreciate that the system may use any fixed or windowed time period to detect call clustering, including fixed or windowed time periods that are expressed as date ranges, time ranges, or by a fixed time duration. When the system detects call clustering, the system may increase the determined probability of fraud. Alternatively, the system may decrease the determined probability of fraud in response to detecting that no call clustering is present. The degree to which the system increases or decreases the determined probability of fraud may be a fixed amount (e.g., increase the determined probability of fraud by 15% if call clustering is detected, or decrease the determined probability of fraud by 2% if no call clustering is present) or by an amount that varies proportionally with the degree of call clustering detected (e.g., increase the determined probability of fraud by a greater amount in cases where the threshold value is exceeded by a larger margin).

As explained with respect to FIG. 3, the fraud detection system may take corrective action if the probability of fraud meets or exceeds a specified threshold. If, for example, a user or system operator set a threshold of a 75% probability of fraud for taking corrective action, no corrective action would be taken in the present example because the actual probability of fraud for the received call is only 50%. If, on the other hand, the user or system operator set a threshold of a 50% probability of fraud for taking corrective action, then the system would take one or more corrective actions because the actual probability of fraud for the received call meets the threshold value of 50%.

From the foregoing, it will be appreciated that specific embodiments of the invention have been described herein for purposes of illustration, but that various modifications may be made without deviating from the scope of the invention. Those skilled in the art will appreciate that the operations and routines depicted in flowchart blocks and otherwise described herein may be altered in a variety of ways. More specifically, the order of the steps may be re-arranged, steps may be performed in parallel, steps may be omitted, other steps may be included, various combinations or omissions of routines may be made, etc. Accordingly, the invention is not limited except as by the appended claims.

We claim:

1. A method for monitoring telephone calls to detect fraudulent activity and take corrective action, comprising:
   receiving a first group of telephone calls having associated voice characteristics;
   analyzing the first group of telephone calls to identify a first set of distributions of voice characteristics that are indicative of normal activity, fraudulent activity, or indeterminate activity;
   storing the identified first set of distributions of voice characteristics;
   receiving a second group of telephone calls having associated voice characteristics;
   analyzing the second group of telephone calls to identify a second set of distributions of voice characteristics associated with the second group of telephone calls, wherein the analysis is performed without transcription, caller identification or recording;
   assessing a probability that the second group of telephone calls corresponds to normal activity, fraudulent activity, or indeterminate activity, wherein the assessing comprises comparing the identified second set of distributions of voice characteristics to the stored first set of distributions of voice characteristics, and wherein the assessed probability of fraudulent activity increases in response to detecting that the second group of telephone calls contains multiple telephone calls originating from the same caller within a determined period of time; and executing a corrective action when the assessed probability that the second group of telephone calls represents fraudulent activity exceeds a threshold.

2. The method of claim 1, wherein the assessed probability is expressed as a numerical percentage.

3. The method of claim 1, wherein the corrective action is withholding a financial incentive from an entity that is associated with a telephone call in the second group of telephone calls.

4. The method of claim 1, wherein the corrective action is blacklisting an entity that is associated with a telephone call in the second group of telephone calls.

5. The method of claim 1, wherein the corrective action is providing a notice to a system operator.

6. The method of claim 5, wherein the notice includes an indication of the assessed probability.

7. The method of claim 1, wherein the received second group of telephone calls corresponds to a distribution channel and the corrective action is executed with respect to the distribution channel.

8. The method of claim 7, wherein the corrective action is flagging the distribution channel for heightened monitoring.

9. The method of claim 7, wherein the corrective action is disabling call activity on the distribution channel.

10. The method of claim 1, wherein the corrective action is taken with respect to a particular advertiser or a particular group of advertisers.

11. The method of claim 1, wherein the corrective action is storing an indication of the assessed probability of fraud to a log in non-volatile memory.

12. The method of claim 10, wherein the log includes two or more of the group consisting of: the assessed probability of fraud, voice characteristics associated with the received telephone call, an advertiser associated with the received telephone call, and a distribution channel associated with the received telephone call.

13. The method of claim 1, wherein the corrective action is not charging an advertiser for activity associated with the received telephone call.

14. The method of claim 1, wherein the first group of telephone calls corresponds to a single distribution channel.

15. The method of claim 1, wherein the first group of telephone calls corresponds to a plurality of distribution channels.

16. The method of claim 1, wherein the distributions of voice characteristics that are indicative of normal activity, fraudulent activity, or indeterminate activity are determined by a scoring function.

17. The method of claim 1, wherein the determined period of time is a windowed period of time.

18. The method of claim 1, wherein the determined period of time is a fixed period of time.

19. The method of claim 1, further comprising:

analyzing the second group of telephone calls to determine whether an attempt has been made to disguise a voice pattern contained in the second group of telephone calls; and in response to determining that an attempt has been made to disguise a voice pattern contained in the second group of telephone calls, increasing the assessed probability of fraudulent activity.

20. A computer-readable storage medium with instructions stored thereon that, when executed by a computing system, cause the computing system to perform a method to monitor telephone calls to detect fraudulent activity and take corrective action, the method comprising:

receiving a first group of telephone calls having associated voice characteristics;

analyzing the first group of telephone calls to identify a first set of distributions of voice characteristics that are indicative of normal activity, fraudulent activity, or indeterminate activity;

storing the identified first set of distributions of voice characteristics;

receiving a second group of telephone calls having associated voice characteristics;

analyzing the second group of telephone calls to identify a second set of distributions of voice characteristics associated with the second group of telephone calls, wherein the analysis is performed without transcription, caller identification or recording;

assessing a probability that the second group of telephone calls corresponds to normal activity, fraudulent activity, or indeterminate activity, wherein the assessing comprises comparing the identified second set of distributions of voice characteristics to the stored first set of distributions of voice characteristics, and wherein the assessed probability of fraudulent activity increases in response to detecting that the second group of telephone calls contains multiple telephone calls originating from the same caller within a determined period of time; and executing a corrective action when the assessed probability that the second group of telephone calls represents fraudulent activity exceeds a threshold.

21. The computer-readable storage medium of claim 20, wherein the assessed probability is expressed as a numerical percentage.

22. The computer-readable storage medium of claim 20, wherein the corrective action is withholding a financial incentive from an entity that is associated with a telephone call in the second group of telephone calls.

23. The computer-readable storage medium of claim 20, wherein the corrective action is blacklisting an entity that is associated with a telephone call in the second group of telephone calls.

24. The computer-readable storage medium of claim 20, wherein the corrective action is providing a notice to a system operator.

25. The computer-readable storage medium of claim 24, wherein the notice includes an indication of the assessed probability.

26. The computer-readable storage medium of claim 20, wherein the received second group of telephone calls corresponds to a distribution channel and the corrective action is executed with respect to the distribution channel.

27. The computer-readable storage medium of claim 26, wherein the corrective action is flagging the distribution channel for heightened monitoring.

28. The computer-readable storage medium of claim 26, wherein the corrective action is disabling call activity on the distribution channel.

29. The computer-readable storage medium of claim 20, wherein the corrective action is taken with respect to a particular advertiser or a particular group of advertisers.

30. The computer-readable storage medium of claim 20, wherein the corrective action is storing an indication of the assessed probability of fraud to a log in non-volatile memory.

31. The computer-readable storage medium of claim 30, wherein the log includes two or more of the group consisting of: the assessed probability of fraud, voice characteristics associated with the received telephone call, an advertiser associated with the received telephone call, and a distribution channel associated with the received telephone call.

32. The computer-readable storage medium of claim 20, wherein the corrective action is not charging an advertiser for activity associated with the received telephone call.

33. The computer-readable storage medium of claim 20, wherein the first group of telephone calls corresponds to a single distribution channel.

34. The computer-readable storage medium of claim 20, wherein the first group of telephone calls corresponds to a plurality of distribution channels.

35. The computer-readable storage medium of claim 20, wherein the distributions of voice characteristics that are indicative of normal activity, fraudulent activity, or indeterminate activity are determined by a scoring function.

36. The computer-readable storage medium of claim 20, wherein the determined period of time is a windowed period of time.

37. The computer-readable storage medium of claim 20, wherein the determined period of time is a fixed period of time.

38. The computer-readable storage medium of claim 20, further comprising:
   analyzing the second group of telephone calls to determine whether an attempt has been made to disguise a voice pattern contained in the second group of telephone calls; and
   in response to determining that an attempt has been made to disguise a voice pattern contained in the second group of telephone calls, increasing the assessed probability of fraudulent activity.

\* \* \* \* \*